United States Patent [19]

Hansford

[11] 3,899,441
[45] Aug. 12, 1975

[54] REJUVENATION OF DAMAGED ZEOLITE-SUPPORTED METAL CATALYSTS

[75] Inventor: Rowland C. Hansford, Yorba Linda, Calif.

[73] Assignee: Union Oil Company of California, Los Angeles, Calif.

[22] Filed: Jan. 8, 1973

[21] Appl. No.: 321,670

Related U.S. Application Data

[63] Continuation-in-part of Ser. No. 170,619, Aug. 10, 1971, abandoned, which is a continuation-in-part of Ser. No. 874,063, Nov. 4, 1969, abandoned.

[52] U.S. Cl............. 252/411 R; 208/111; 208/120; 252/412; 252/416; 252/420; 252/455 Z
[51] Int. Cl........................ B01j 11/18; B01j 11/16
[58] Field of Search .......... 252/411, 412, 416, 419, 252/420, 455 Z; 208/120

[56] References Cited
UNITED STATES PATENTS

| | | |
|---|---|---|
| 3,197,399 | 7/1965 | Wight et al. ...................... 252/416 |
| 3,210,267 | 10/1965 | Plank et al. ........................ 208/120 |
| 3,239,471 | 3/1966 | Chin et al. .......................... 252/416 |
| 3,287,257 | 11/1966 | Hansford et al. .................. 252/416 |
| 3,354,077 | 11/1967 | Hansford ........................... 208/111 |
| 3,392,124 | 7/1968 | Laurent ............................. 208/120 |
| 3,404,086 | 10/1968 | Plank et al. ........................ 252/455 |
| 3,493,490 | 2/1970 | Plank et al. ........................ 252/420 |
| 3,523,887 | 8/1970 | Hanson et al. ..................... 252/411 |

*Primary Examiner*—Winston A. Douglas
*Assistant Examiner*—P. E. Konopka
*Attorney, Agent, or Firm*—Lannas S. Henderson; Richard C. Hartman; Dean Sandford

[57] ABSTRACT

Zeolite supported Group VIII metal hydrogenation catalysts which have undergone damage by thermal and/or hydrothermal stresses resulting in a maldistribution of the supported metal, are rejuvenated in activity by first hydrating and ammoniating, then calcining in a dry, oxygen-containing gas stream at temperatures controlled between about 500° and 1200°F.

16 Claims, No Drawings

3,899,441

REJUVENATION OF DAMAGED ZEOLITE-SUPPORTED METAL CATALYSTS

RELATED APPLICATIONS

This application is a continuation in part of Ser. No. 170,619, filed Aug. 10, 1971 and now abandoned, which in turn is a continuation in part of Ser. No. 874,063, filed Nov. 4, 1969 and now abandoned.

BACKGROUND AND SUMMARY OF INVENTION

It is well known that maximum activity of the Group VIII metals for hydrogenation reactions depends upon maintaining the metal in a finely divided state such that there is a maximum ratio of surface area to mass. Perhaps the most common method of achieving a high degree of dispersion involves impregnating salts of the Group VIII metals upon porous solid supports, followed by drying and decomposing of the impregnated salt. On non-zeolitic supports, the drying and calcining operations often bring about a substantial migration and agglomeration of the impregnated metal, with resultant reduction in activity. In more recent years, with the advent of highly active crystalline zeolite catalysts of the aluminosilicate type, it has become common practice to ion exchange the desired metal salt into the zeolite structure in an attempt to achieve an ionic bond between each metal atom and an exchange site on the zeolite, thus achieving the ultimate in dispersion of metal while also bonding the metal to the zeolite in such manner as to minimize migration and agglomeration during the drying and calcining steps. This ion exchange technique is particularly desirable in the case of dual-function catalysts such as hydrocracking catalysts wherein it is desirable to maintain an active hydrogenating site closely adjacent to an acid cracking site. These efforts have met with varying degrees of success.

Even though the above described ion-exchange techniques can give a high degree of initial dispersion of metal on the support, conditions encountered during subsequent use of the catalyst may bring about a maldistribution of the metal with resultant reduction in activity, entirely independent of normal deactivating phenomena such as coking, fouling, poisoning, etc. Overheating, or contact with excessive partial pressures of water vapor at high temperatures, such as may occur during oxidative regeneration of the catalyst, may bring about migration of the active metal away from the exchange sites, and this migration may, under particularly severe conditions, ultimately result in macroagglomeration of the metal into crystallites of 100–200 A or more in diameter. This particular type of damage is most apt to occur under oxidizing conditions at temperatures of 500°–950°F. where high partial pressures of water vapor are present. U.S. Pat. No. 3,287,257 describes one desirable method for redispersing such metal agglomerates. The process of this invention however is not particularly effective for redispersing metal agglomerates of greater than about 50 A diameter.

The process of this invention is particularly directed to correcting metal maldistribution which has not yet progressed to a state of extensive agglomeration. Thermal and/or hydrothermal stresses encountered by the catalyst in normal usage, regeneration, or during accidental upsets entailing uncontrolled temperatures and/or water vapor partial pressures may in many instances bring about a maldistribution of active metal short of extensive agglomeration to particle sizes larger than about 50 A. For example, metal atoms or aggregates initially associated with active exchange sites on the carrier may migrate to other less active areas, thus reducing the statistical liklihood of conjoint action on the feedstock molecules of both an acidic cracking site and a hydrogenation site. Further migration may tend to drive the metal deeper into the support structure, or into pore structures which are relatively inaccessible by feed molecules, all resulting in reduced overall hydrogenation activity.

Limited migration of these types may occur when the catalyst, in a sulfided condition (as e.g. in normal use for hydrocracking), or in an oxidized state (as during regeneration), comes into contact for more than about 30 minutes with water vapor of greater than about 10 psi partial pressure at temperatures above about 500°F. Extended contacting under these conditions, or at extremely high partial pressures of water vapor, e.g., above about 100 psi, can ultimately lead to macroagglomeration of the type previously described. If this should occur, the rejuvenation procedure of this invention is less effective per se, but can advantageously be utilized following partial redispersal of the agglomerated metal by, for example, the methods described in U.S. Pat. Nos. 3,197,399 and/or 3,287,257. The processes described in these patents, involving respectively, alternating oxidation-reduction cycles, and alternating sulfiding-oxidation cycles, can bring about a substantial redispersion of agglomerated metal into particles of less than about 50 A diameter, but do not in most instances bring about a complete recovery of the fresh catalyst activity. The process of this invention is designed to achieve a complete recovery of fresh activity, and in some cases greater than fresh activity.

While I do not wish to be bound by any theoretical explanation of the results achieved herein, it appears that the rejuvenation process involves a reconstitution of the original ion-exchange cationic species of the hydrogenating metal, or the soluble metal amminohydroxide, in the pores of the catalyst by treatment with aqueous ammonia. Hydration and ammoniation of the deactivated catalyst, in which the metal is in an oxidized or sulfided form, fills the micropores with a strong aqueous ammonia solution. This results in dissolution of the metal oxide or sulfide in the ammonia solution to form the original cationic species, or soluble ammino-hydroxide, which was originally ion-exchanged into the zeolite. For example, palladium oxide on the zeolite support will form the $Pd(NH_3)_4^{++}$ ion, which then migrates back to the original ion exchange sites. The original distribution of palladium is then theoretically obtained after drying and recalcining as in the original catalyst preparation method. Similarly, platinum oxide on amorphous silica-alumina will form $Pt(NH_3)_4(OH)_2$ or $Pt(NH_3)_6(OH)_4$ which, being stronger bases than $NH_4OH$, will tend to combine with the original acid sites on the support. The original distribution of platinum with respect to acid sites will then theoretically be obtained after drying and calcining.

Irrespective of the correct theoretical explanation for the results achieved herein, the experimental evidence available indicates that the hydration-ammoniation-drying-calcining procedure described herein can give substantially complete rejuvenation of zeolite-based Group VIII metal catalysts wherein a maldistribution of metal has occurred as a result of overheating, or of contacting the catalyst while in an oxidized or sulfided state with water vapor at temperatures between about 500° and 1200°F., and wherein a substantial proportion of the maldistributed metal is in the form of agglomerates of less than about 50 A in diameter. Where a portion of the maldistributed metal is in the form of larger aggregates, the degree of rejuvenation achieved will be roughly proportional to the ratio of maldistributed metal appearing as aggregates of less than 50 A diameter and the proportion appearing as aggregates of greater than about 50 A diameter.

It is noted that U.S. Pat. No. 3,239,471 discloses a hydration-ammoniation procedure for imparting mechanical stability to certain pelleted zeolite catalysts, which procedure is similar in some respects to the process of this invention. However, the patented process appears to be designed only for stabilizing catalysts prepared by compressing into tablets an incompletely hydrated, powdered form of the zeolite; apparently under these conditions insufficient water and/or ammonia remains in the catalyst pellets during the subsequent calcining to give the desired mechanical strength and stability.

Several compounding procedures have been subsequently discovered however which give stable, particulate aggregates which are not further strengthened or stabilized by the patented process. Notably, extrusion, casting or copelleting of fully hydrated mixtures of the zeolite and a suitable amorphous, relative non-zeolitic inorganic oxide binder such as alumina gel, silica gel, alumina-silica cogels, clays and the like, are found to yield calcined aggregates which have crushing strengths above 20 pounds per ⅛ inch pellet. This crushing strength is moreover stable, and does not increase or decrease more than about 10%, usually no more than about 5%, throughout a complete cycle of hydrocarbon conversion, oxidative regeneration and rejuvenation as described herein. These mechanically stable catalysts are preferably employed herein, and may be objectively characterized as losing no more than about 5% of their crushing strength when calcined for 2 hours in hydrogen at 700°F., and gaining substantially nil, or less than about 5%, in crushing strength when subjected to the rejuvenation procedure of this invention.

DETAILED DESCRIPTION

A. Hydration-Ammoniation

These steps may be carried out by any desired procedure which will give a substantial adsorption of water into the micropores of the catalyst and adsorption-solution of a substantial proportion, at least about 5 weight-percent and preferably 10 to 35 weight-percent, of ammonia into the adsorbed water phase, based on the weight of the water phase. Preferably, the catalyst is first hydrated and then ammoniated, but simultaneous hydration and ammoniation is also contemplated. Simultaneous hydration and ammoniation can be effected by wetting the catalyst with an aqueous ammonia solution, but care should be exercised to avoid excessive amounts of solution which might tend to leach active metal out of the catalyst. In the preferred procedure, the catalyst is simply hydrated in moist air to an extent of e.g., 5–40 weight-percent, and then contacted with gaseous ammonia until the liquid water phase is substantially saturated with ammonia. The hydration and ammoniation steps are preferably carried out at temperatures between about 0° and 150°F., but temperatures up to about 300°F. or even higher are contemplated. Normally these steps are carried out at atmospheric pressure, but reduced or superatmospheric pressures may be utilized.

For treating large batches of catalyst, it is normally desirable to hydrate by passing moist air or other wet gas through a bed of the catalyst until there is a substantial breakthrough of water vapor in the effluent gases. Ammoniation may be similarly effected by passing ammonia, or ammonia-containing gases, through the bed until ammonia appears in the off gases. Simultaneous hydration and ammoniation can be effected by passing a gas stream containing both ammonia and water vapor through the catalyst bed until both water vapor and ammonia appear in the off gases.

In any of the above procedures, it will be understood that in cases where the zeolite base is in a hydrogen or "decationized" form, the ammoniation will convert the zeolite to an ammonium zeolite, in addition to saturating the adsorbed water with ammonia. The dissolved ammonia is mostly removed during the subsequent drying step, while the zeolitic ammonium ions are removed predominantly by combustion during the final calcining step.

Normally the desired redistribution of active metal on the zeolite base takes place rapidly, i.e. within about 10–30 minutes following hydration and ammoniation, and hence the drying step can be commenced substantially immediately thereafter. However, in some cases, as for example where a substantial agglomeration of metal has occurred, it may be desirable to age the catalyst in its hydrated-ammoniated form for periods ranging from about one hour to twelve hours or more.

B. Drying Step

The drying step at temperatures below 500°F. is essential in a practical sense, though perhaps not from an abstract theoretical standpoint. The desired ultimate objective of converting the catalyst to a deammoniated, oxidized form by calcining could perhaps be achieved with great difficulty and expense by carefully controlled rapid heatup to, e.g., 950°F. in air, but to achieve maximum catalytic activity in this manner would be a practical impossibility. The reason for this stems from the observed fact that at temperatures between about 500° and 950°F. the metal on the catalyst, when in an oxidized state, tends to undergo severe agglomeration unless the water vapor partial pressure is carefully controlled. Hence, a rapid heatup in air would tend to raise the catalyst temperature to above 500°F. before some portions of the catalyst bed (or even some areas of each catalyst pellet) had been sufficiently dehydrated to permit control of localized water vapor concentrations. In general, in order to avoid agglomeration of oxidized metal on the catalyst in the 500°–950°F. temperature range, it is desirable to maintain water vapor partial pressures below about 10 psi, and preferably below 2 psi. It is therefore highly desirable to reduce the water content of the catalyst to a practical minimum at temperatures below 500°F., for at temperatures above about 500°F. the catalyst is rapidly being converted to an oxidized state with chemical evolution of water. At below about 500°F., the metal or metal oxide is not affected by water vapor.

Accordingly, for the above purposes, the drying step may be carried out by passing a stream of air or other non-reducing gas through a bed of the catalyst without maintaining dewpoint control over the effluent gases.

It is generally preferable however to start the drying at a lower temperature of e.g. 100° to 200°F., and incrementally raise the stripping gas temperature to a level in the 300° to 500°F. range. During the drying step, nearly all of the ammonia absorbed into the water phase in the catalyst is removed, any remaining ammonia being primarily in the form of zeolitic ammonium cations. It is this zeolitic ammonium which creates an additional problem of water vapor partial pressure control during the subsequent calcination step, for it is during this step that zeolitic ammonium is oxidized to form additional water vapor (and nitrogen), which adds its effect to that of the water vapor generated by desorption of any remaining water in the catalyst. Hence the practical necessity for stripping out at least about one-half, and preferably at least about two-thirds of the adsorbed water during the drying step at temperatures below about 500°F.

It is to be noted also that reducing gases such as hydrogen should be substantially absent during the drying step. For reasons which are not clearly understood, direct reduction of the complex metal ammine cation to the free metal always results in severe agglomeration thereof. Hence the necessity for first converting the metal ammino complex to an oxidized state during the calcining step, and then later reducing the oxidized metal to activate the same for use in hydrocarbon conversions. Suitable stripping gases for use in the drying step include air or other oxygen-containing gases, nitrogen, argon, methane and the like. The drying is normally carried out at atmospheric pressures, or slightly elevated pressures of e.g., 50 to 100 psig. Where crystalline zeolite catalysts are concerned, it is normally desirable to reduce the water content to about 5–10 weight-percent.

C. Calcination Step

The calcination step may be performed in the same apparatus employed for the drying step if desired, e.g. in a rotary kiln, a moving belt furnace, or in a vessel containing a fixed bed of the catalyst. To initiate the calcination, air is admixed with the stripping gas, initially in small proportions to provide an oxygen concentration of e.g. about 0.1 to 1% by volume. The temperature of the calcination gas is then gradually increased from about 500°F. to 700°–750°F. while gradually increasing the oxygen concentration to e.g. about 0.5 to 2%. During the entire heatup period, water concentration in the calcination vessel should be carefully controlled, as by monitoring the effluent gases to maintain a dewpoint below about 40°F., preferably below 20°F. Following each incremental increase in oxygen concentration it is generally desirable, in the case of fixed bed calcinations, to wait for the exothermic temperature wave to pass through the catalyst bed and until oxygen breakthrough has occurred before the next incremental increase in oxygen concentration is effected. Continuing in this manner, inlet gas temperatures and oxygen concentrations are increased until temperatures of about 900° to 1100°F. and final oxygen concentrations in the range of about 2–10% or more are reached. When the terminal temperature and oxygen concentrations are reached, the calcination is then preferably continued for a sufficient length of time to give an effluent gas stream having a dewpoint below about 0°F., preferably below about −20°F.

The gradual heatup procedure with incremental increases in oxygen concentration as described above is a practical necessity when the calcination is carried out with a fixed bed of catalyst through which the calcination gases are passed. It is not intended however that the invention be limited to this procedure, for a considerably more rapid heatup at high oxygen concentrations can be utilized when the catalyst is arranged in thin layers through which the gases pass, whereby the effect of water vapor on downstream portions of the catalyst is minimized. Commercially, a rotary kiln equipped with lifters and a dry air sparger to provide good ventilation of the cascading bed of catalyst is very effective in achieving the desired results of this invention. A particularly critical period during the calcination appears to be the period of burnoff of zeolitic ammonium ions, which occurs primarily at temperatures above about 750°F. and can generate a burning wave in the catalyst wherein instantaneous temperatures and water vapor concentrations may inhibit full recovery of the original fresh catalyst activity. Accordingly, greatest care should be exercised to minimize water vapor concentrations during the 750°–1000°F. heating cycle.

D. Catalyst Compositions

Catalyst compositions which may be rejuvenated by the above procedures include hydrogenation catalysts, hydrocracking catalysts, isomerization catalysts, reforming catalysts and the like which comprise a Group VIII metal, with or without other metals or metal oxides such as those of the Group VIB metals, supported on a siliceous zeolite base having an ion exchange capacity of at least about 0.01 meq/gm, and preferably at least about 0.1 meq/gm. Suitable siliceous zeolite bases include for example the crystalline aluminosilicate molecular sieves such as the Y, X, A, L, and B crystal types, as well as zeolites found in nature such as for example mordenite, stilbite, heulandite, ferrierite, dachiardite, chabazite and the like. The preferred crystalline zeolites are those having crystal pore diameters between about 8–12 A, wherein the $SiO_2/Al_2O_3$ mole ratio is about 3/1 to 6/1. For most catalytic purposes, e.g. catalytic hydrocracking, it is preferable to replace most or all of the zeolitic sodium normally associated with such zeolites with other cations, particularly hydrogen ions and/or polyvalent metal ions such as magnesium, calcium, zinc, rare earth metals and the like.

In addition to the crystalline zeolite bases described above, other zeolitic bases may be employed such as the zeolitic cogels of silica and alumina, silica and titania, silica and zirconia, silica and magnesia and the like.

The Group VIII metal hydrogenating component is ordinarily added to the zeolite base by ion exchange with an aqueous solution of a suitable compound of the desired metal wherein the metal is present in a cationic form, as described for example in U.S. Pat. No. 3,236,762. Suitable amounts of the iron group metals, i.e. iron, cobalt and nickel, may range between about 1 and 20% by weight, while the noble metals e.g., palladium and platinum are normally employed in amounts ranging between about 0.1 and 2% by weight. The noble metals, particularly palladium and platinum, are normally preferred herein.

When catalysts of the foregoing description are utilized for extended periods of time at temperatures of e.g., 400°–950°F. in hydrocarbon conversions such as hydrocracking, hydrogenation, isomerization, reforming and the like, a progressive decline in catalyst activity normally occurs as a result of coke deposition. A more rapid or sudden decline in activity will normally follow when the catalyst encounters, either during hydrocarbon conversion or during regeneration, any of the adverse conditions of temperature and water vapor partial pressure previously described. Deactivation by coking is normally almost completely reversible by conventional oxidative regeneration at temperatures of, e.g., 750° – 1100°F. When it is found that such oxidative regeneration restores less than about 90% of the fresh hydrogenation activity, it may be assumed that some undesirable maldistribution of the hydrogenating metal has occurred. Where less than about 5% of the original fresh hydrogenation activity is recovered, it may be assumed that some macro-agglomeration of the metal has occurred, such as would not be completely reversible by the rejuvenation process of this invention. Hence, for practical purposes the rejuvenation procedure is generally and most usefully applied to catalysts which, upon conventional oxidative regeneration, regain from about 5 to 90% of their fresh hydrogenation activity. It will be understood that hydrogenation activity is measured in terms of, and is inversely proportional to, the volume of catalyst required to effect a given degree of hydrogenation per pass of a particular compound, e.g., benzene, at a particular set of hydrogenation conditions.

The following examples are cited to illustrate the invention, but are not to be construed as limiting in scope.

EXAMPLE I

This example illustrates a typical type of hydrothermal deactivation which can occur during catalytic hydrocracking. A commercial hydrocracking run was carried out over a period of about twenty months utilizing a catalyst consisting of 0.5 weight-percent Pd supported on a ⅛ inch copelleted composite of 20% $Al_2O_3$ and 80% of a Y molecular sieve cracking base having a $SiO_2/Al_2O_3$ mole-ratio of about 4.7, wherein about 35% of the zeolitic ion exchange capacity was satisfied by magnesium ions (3 weight-percent MgO), about 10 percent by sodium ions, and the remainder (55%) by hydrogen ions. This catalyst was maintained in a sulfided condition throughout the run by virtue of a sour recycle gas containing about 0.3 volume percent of hydrogen sulfide. The run was carried out at a pressure of about 1500 psig, with space velocities varying between about 1.3 and 1.7, hydrogen rates varying between 5,000 and 7,000 scf/b, and with hydrocracking temperatures progressively increasing from about 500°F. to 680°F. The feedstock was a substantially sulfur- and nitrogen-free unconverted gas oil (400°–850°F. boiling range) derived from a previous stage of hydrocracking. Hydrocracking temperatures were incrementally raised during the run to maintain 60–70 volume percent conversion per pass to gasoline.

During this run, a foaming problem was encountered in the recycle gas water-washing column, resulting in a substantial quantity of water being carried into the reactor, giving an estimated 100 psi partial pressure of water vapor therein for a period of about 4 hours. An immediate temperature increase of about 55°F. was required in order to maintain the desired conversion level, this temperature increase corresponding to a loss in catalytic activity of about 85%.

At the end of this run, the catalyst was carefully regenerated by oxidative combustion at temperatures ranging from about 700° up to 1000°F., utilizing a regeneration gas comprising oxygen in amounts increasing from about 0.1 to 3.0 volume percent, whereby water vapor partial pressures were maintained at a value below about 0.25 psia at all regeneration temperatures above 500°F. The regenerated catalyst (which had a crushing strength of 30.4 pounds) was then tested for activity compared to that of the fresh catalyst. The feedstock used for the activity test was the same feed used in the previous hydrocracking run, doped with thiophene to a level of 0.48% sulfur to provide an $H_2S$-containing atmosphere for the hydrocracking. Conditions of the activity test were: pressure 1450 psig, LHSV 1.7, hydrogen/oil ratio 8,000 scf/b, conversion per pass 52–54 volume percent to gasoline. The following table shows the temperatures required to maintain the above conversion as a function of time:

| Hours | Fresh Catalyst | Regenerated Catalyst |
|---|---|---|
| 20 | 528°F. | 577°F. |
| 40 | 539 | 591 |
| 60 | 544 | 600 |
| 80 | 547 | 606 |
| 100 | 550 | 610 |
| 150 | 554 | 620 |
| 200 | 556 | 625 |
| 250 | 559 | 629 |
| 500 | 564 | 637 |
| 700 | 565 | 642 |

It will be noted that the regenerated catalyst required an initial hydrocracking temperature 49° higher than did the fresh catalyst, and that the regenerated catalyst declined much more rapidly in activity, requiring a 77°F. higher temperature at the end of 700 hours. The high deactivation rate of the regenerated catalyst clearly indicates a deficiency in hydrogenation activity resulting from a maldistribution of the palladium brought about during the above described process upset.

EXAMPLE II

A sample of the catalyst regenerated as described above was treated according to the present invention as follows:

1. Allowed to hydrate in ambient air to a saturation value of about 25% by weight of water on a hydrated basis.
2. Treated with gaseous ammonia at ambient temperatures and pressures to substantially saturate the water in the catalyst pores (about 25–30 wt-% $NH_3$ based on water).
3. Allowed to stand overnight in ambient air to volatilize most of the excess ammonia.
4. Stripped and partially dried to a water content of about 6–8 wt-% in a muffle furnace through which a stream of dry air was passed for two hours at temperatures increasing from ambient to 480°F., and then for two hours at 480°F.
5. Calcined in the same muffle furnace while continuing the flow of dry air for one hour at temperatures increasing from 480° to 930°F., and then for one hour at 930°F.

The catalyst was then removed from the furnace and cooled in a sealed container. The activity test was carried out in the same manner as in Example I, with the following results:

| Hours | Temperature for 52–45% Conversion to 400°F. E.P. Gasoline |
|---|---|
| 20 | 541°F. |
| 40 | 550 |
| 60 | 555 |
| 80 | 558 |
| 100 | 560 |
| 150 | 563 |
| 200 | 565 |
| 250 | 568 |

The foregoing data shows that the rejuvenated catalyst of this example was almost as active as the original fresh catalyst; the required conversion temperatures leveled out at 100–250 hours to a value only about 9°–10° higher than the corresponding temperatures required for the fresh catalyst.

(Another sample of the deactivated catalyst of Example I, after storage for 2 years, was regenerated and rejuvenated as described in Examples I and II, and was then found to have a crushing strength of 30.9 pounds.)

If the drying step (4) in the above example is omitted, and the catalyst simply calcined for one hour at temperatures from ambient to 930°F. followed by one hour at 930°F., the resulting catalyst is much less active than the original regenerated catalyst of Example I, due to palladium agglomeration brought about by excessive water vapor partial pressures during the rapid heatup from ambient to 930°F.

EXAMPLE III

Another sample of the regenerated catalyst from Example I was rejuvenated by a procedure which would be more practical commercially. The hydration step was carried out by passing a stream of nitrogen saturated with water vapor at 125°F. through a fixed bed of the catalyst until complete breakthrough of water vapor occurred. Ammonia gas was then passed through the catalyst bed until ammonia breakthrough occurred. The catalyst was then stripped with dry nitrogen for about two hours at 300°F. to remove most of the adsorbed ammonia and water. Air was then introduced at a low rate (100 ghsv) while the temperature was raised at a rate of 50°F. per hour to 930°F. After two hours at 930°F., the catalyst was cooled and activity tested as in Examples I and II, with the following results:

| Hours | Temperature for 52–54% Conversion To 400°F. E.P. Gasoline |
|---|---|
| 20 | 525°F. |
| 30 | 528 |
| 40 | 530 |
| 60 | 534 |

The above results demonstrate that the rejuvenated catalyst of this example is, quite remarkably, about 50% more active than the original fresh catalyst. This would seem to indicate that some of the palladium even in the fresh catalyst was not distributed in an optimum manner. It is believed probable that the calcination procedure of this example, wherein dry air was passed through the catalyst bed instead of across the bed as in Example II, is more effective in preventing agglomeration of palladium, thus accounting for the superior results.

The foregoing details as to specific catalysts and rejuvenation conditions are not intended to be limiting in effect. The following claims and their obvious equivalents are intended to define the true scope of the invention:

I claim:

1. A method for rejuvenating and redispersal of catalytic metal of a catalyst comprising a Group VIII metal supported on particulate aggregates of a siliceous zeolite, said catalyst having been compounded by a procedure which yields mechanically stable calcined aggregates having a crushing strength above about 20 pounds per ⅛ inch pellet, and whose mechanical strength is not increased or decreased more than about 10% by any of the hereinafter recited hydrocarbon conversion, oxidative regeneration or rejuvenation procedures, said catalyst having been utilized in a hydrocarbon conversion process to substantial deactivation and subsequently regenerated by oxidative combustion, and during said hydrocarbon conversion and/or regeneration having been subjected to thermal or hydrothermal conditions of sufficient severity to bring about a maldistribution of said Group VIII metal with resultant loss in hydrogenation activity wherein a substantial proportion of the maldistributed metal is in the form of agglomerates of less that 50 A in diameter, which comprises:

1. contacting said catalyst, in its oxidized regenerated state and at a temperature below about 300°F., either simultaneously or in the order named, with water or water vapor and with ammonia to effect adsorption therein of about 5–40 weight-percent of water and about 5–35 weight-percent of ammonia based on the weight of adsorbed water; and 2. drying and calcining the resulting hydrated, ammoniated catalyst in a stream of substantially dry, oxygen-containing gas at elevated temperatures terminating in the range of about 750° – 1200°F., and recovering a substantially completely dehydrated and deammoniated catalyst having improved hydrogenation activity.

2. A method as defined in claim 1 wherein said Group VIII metal is a noble metal, and said siliceous zeolite is a molecular sieve of the Y crystal type wherein the zeolitic cations are primarily hydrogen ions and/or polyvalent metal ions.

3. A method as defined in claim 2 wherein said noble metal is palladium and wherein the zeolitic cations in said Y molecular sieve comprise a substantial proportion of hydrogen ions.

4. A process as defined in claim 1 wherein the water vapor partial pressure in step (2) is maintained at below about 2 psi at all temperatures above about 500°F.

5. A method for rejuvenating and redispersal of catalytic metal of a catalyst comprising a Group VIII metal supported on particulate aggregates of a siliceous zeolite, said catalyst having been compounded by a procedure which yields mechanically stable calcined aggregates having a crushing strength above about 20 pounds per ⅛ inch pellet, and whose mechanical strength is not increased or decreased more than about 10% by the hereinafter recited thermal or hydrothermal conditions or rejuvenation procedure, said catalyst having been subjected to thermal or hydrothermal conditions of sufficient severity to bring about a maldistribution of said Group VIII metal with resultant loss in hydrogenation activity wherein a substantial proportion of the maldistributed metal is in the form of agglomerates of less than 50 A in diameter, which comprises:

1. contacting said catalyst, in an oxidized or sulfided state and at a temperature below about 300°F., either simultaneously or in the order named, with water or water vapor and with ammonia to effect adsorption therein of about 5–40 weight-percent of water and about 5–35 weight-percent of ammonia based on the weight of adsorbed water;
2. stripping the resulting hydrated, ammoniated catalyst in a stream of non-reducing gas at temperatures below about 500°F. to effect partial deammoniation and drying; and
3. calcining the partially dried and deammoniated catalyst in a stream of substantially dry oxygen-containing gas at temperatures controlled between about 500° and 1200°F., and recovering a substantially completely dehydrated and deammoniated catalyst having improved hydrogenation activity.

6. A method as defined in claim 5 wherein said hydration and ammoniation in step (1) are carried out simultaneously.

7. A method as defined in claim 5 wherein said hydration and ammoniation in step (1) are carried out in the sequence of hydration followed by ammoniation.

8. A method as defined in claim 5 wherein said Group VIII metal is a noble metal.

9. A method as defined in claim 5 wherein said zeolite is a crystalline molecular sieve.

10. A method as defined in claim 5 wherein said catalyst has a crushing strength above 20 pounds per ⅛ inch pellet when subjected to step (1).

11. A method for rejuvenating and redispersal of catalytic metal of a catalyst comprising a Group VIII metal supported on particulate aggregates of a siliceous zeolite and a relatively non-zeolitic inorganic oxide binder, said catalyst having been compounded by a procedure which yields mechanically stable calcined aggregates having a crushing strength above about 20 pounds per ⅛ inch pellet, and whose mechanical strength is not increased or decreased more than about 10% by any of the hereinafter recited hydrocarbon conversion, oxidative regeneration or rejuvenation procedures, said catalyst having been utilized in a hydrocarbon conversion process to substantial deactivation and subsequently regenerated by oxidative combustion, and during said hydrocarbon conversion and/or regeneration having been subjected to thermal or hydrothermal conditions of sufficient severity to bring about a maldistribution of said Group VIII metal with resultant loss in hydrogenation activity wherein a substantial proportion of the maldistributed metal is in the form of agglomerates of less than 50 A in diameter, which comprises:

1. contacting said catalyst, in its oxidized regenerated state and at a temperature below about 300°F., either simultaneously or in the order named, with water or water vapor and with ammonia to effect adsorption therein of about 5–40 weight-percent of water and about 5–35 weight-percent of ammonia based on the weight of adsorbed water;
2. stripping the resulting hydrated, ammoniated catalyst in a stream of non-reducing gas at temperatures between about 250° and 500°F. to effect substantial deammoniation and partial drying with removal of at least about one-half of the water added in step (1); and
3. calcining the partially dried and deammoniated catalyst in a stream of oxygen-containing gas at progressively increasing temperatures between about 500° and 1200°F., controlled to maintain the dewpoint of the effluent gas stream below about 40°F., at least the terminal portion of said calcining being carried out at temperatures between about 750° and 1200°F. for a sufficient length of time to produce an effluent gas stream having a dewpoint below about 0°F., and a substantially completely dehydrated and deammoniated catalyst having improved hydrogenation activity.

12. A method as defined in claim 11 wherein said hydration and ammoniation in step (1) are carried out simultaneously.

13. A method as defined in claim 11 wherein said hydration and ammoniation in step (1) are carried out in the sequence of hydration followed by ammoniation.

14. A method as defined in claim 11 wherein said Group VIII metal is a noble metal, and said zeolite is a molecular sieve of the Y crystal type wherein the zeolitic cations are primarily hydrogen ions and/or polyvalent metal ions.

15. A method as defined in claim 14 wherein said noble metal is palladium and wherein the zeolitic cations in said Y molecular sieve comprise a substantial proportion of hydrogen ions.

16. A method as defined in claim 11 wherein said catalyst has a crushing strength above 20 pounds per ⅛ inch pellet when subjected to step (1).

* * * * *